United States Patent [19]

Arnold et al.

[11] 3,904,686

[45] Sept. 9, 1975

[54] PREPARATION OF THIOCARBAMYL SULFENAMIDES

[75] Inventors: Robert J. Arnold, Evanston; Marion J. Gattuso, Hoffman Estates, both of Ill.

[73] Assignee: Universal Oil Products Company, Des Plaines, Ill.

[22] Filed: Sept. 24, 1973

[21] Appl. No.: 400,289

[52] U.S. Cl. ............................................. 260/551 S
[51] Int. Cl.[2] ........................................ C07C 155/08
[58] Field of Search .................................... 260/551

[56] References Cited
UNITED STATES PATENTS

| | | | |
|---|---|---|---|
| 2,318,482 | 5/1943 | Hanslick | 260/551 |
| 2,424,921 | 7/1947 | Smith et al. | 260/551 |
| 2,459,759 | 1/1949 | Alliger | 260/551 |

*Primary Examiner*—Harry I. Moatz
*Attorney, Agent, or Firm*—James R. Hoatson, Jr.; Raymond H. Nelson; William H. Page, II

[57] ABSTRACT

The preparation of thiocarbamyl sulfenamides and particularly the preparation of disubstituted-thiocarbamyl cycloalkylsulfenamides may be improved by utilizing an excess of the dithiocarbamate solution which is reacted with the chlorocycloalkylamine and heating the reaction mixture for a short period of time.

7 Claims, No Drawings

PREPARATION OF THIOCARBAMYL SULFENAMIDES

BACKGROUND OF THE INVENTION

The use of thiocarbamyl sulfenamides as accelerators for the sulfur vulcanization of rubber, is well known in the art. Various substituted thiocarbamyl sulfenamides have been proposed in the prior art for such use. In these, the substitutions which are attached to the sulfenamide nitrogen are alkyl, cycloalkyl or heterocyclic in nature.

The preparation of these thiocarbamyl sulfenamides presently requires a process which includes two steps. In the first step an alkali metal dithiocarbamate is formed by the reaction of carbon disulfide with a secondary amine and a metal hydroxide in aqueous solution. The second step is the condensation of this dithiocarbamate with an amine to form a thiocarbamyl-N'-alkylsulfenamide. In the second step the amine which is used may comprise an alkylamine which has been treated with an oxidizing agent such as an alkali metal hypochlorite to form an N-chlorocycloalkylamine, the latter being then reacted with the aforementioned dithiocarbamate.

The first step of the two-stage reaction process in which a secondary amine is reacted with carbon disulfide and an alkali hydroxide is usually quantitative in nature. The reaction will proceed well at ambient temperature and atmospheric pressure in which most dialkylamines and the product are soluble in the aqueous reaction mixture. Inasmuch as the further steps in the reaction require an aqueous solution system, the isolation of the dithiocarbamate is unnecessary and it is reacted in situ. In contradistinction to this, the second step of the process, in which the dithiocarbamate is reacted with an amine such as an alkylamine or cycloalkylamine, presents a different problem. Some methods which were used in the prior art disclose the fact that the conditions for the preparation of the thiocarbamyl-N'-alkylsulfenamides such as the oxidative condensation of a mercaptan with an amine by the addition of an oxidizing agent to a mixture of the amine and a metal mercaptide were applicable to thiocarbamyl sulfenamide synthesis only if the oxidizing agent was an aqueous solution of potassium iodide and iodine. Other oxidizing agents such as sodium hypochlorite or chlorine were found to be unsuitable as oxidants and relatively large amounts of undesired disulfides were formed when stronger oxidizing agents were used.

As will be hereinafter shown in greater detail, it has now been found that an improvement in the preparation of the sulfenamide formed in the second step can be effected by utilizing certain techniques, these techniques and conditions being set out in greater detail in the following specification.

This invention relates to an improvement in a process for the preparation of thiocarbamyl sulfenamides. More specifically the invention is concerned with an improvement in obtaining dialkyl-substituted thiocarbamyl-N'-cycloalkylsulfenamides.

As hereinbefore set forth, the present invention is concerned with a process for improving the preparation of N,N-dialkylthiocarbamyl-N'-cycloalkylsulfenamides, useful as vulcanization accelerators in the vulcanization of rubber. The vulcanizable diene rubber formulations which are used will include styrene-butene copolymer (SBR); copolymer of butadiene and acrylonitrile (MBR); copolymer of butadiene and isoprene with alphamethylstyrene, ring substituted styrenes, chloromethyl styrenes, etc.; butadiene-isoprene copolymer; isobutylene-isoprene copolymer, isobutylene-cyclopentadiene copolymer; vinyl pyridine; polybutadiene, synthetic polyisoprene, ethylene-propylene-diene terpolymer (EPD), natural rubber, etc. As was previously mentioned, the dialkylthiocarbamyl sulfenamides are obtained in a two step process. However, the second step of the process has been difficult to effect inasmuch as lower yields of the desired product are obtained in many instances. As will be hereinafter shown in greater detail, it is possible to effect the second step of the process in such a manner so that yields greater than 90% of the desired product are obtained.

It is therefore an object of the present invention to provide an improved process for the preparation of thiocarbamyl-N'-cycloalkylsulfenamides.

In one aspect an embodiment of this invention resides in a process for the preparation of a thiocarbamyl sulfenamide which comprises the steps of (1) reacting a secondary amine with carbon disulfide and an alkali hydroxide to form an alkali metal dithiocarbamate, (2) reacting a cycloalkylamine with an alkali metal hypochlorite to form an N-chlorocycloalkylamine, and thereafter (3) reacting the alkali metal dithiocarbamate and N-chlorocycloalkylamine to form the desired N,N'-disubstituted-thiocarbamyl-N'-cycloalkylsulfenamide, the improvement which comprises effecting step 3 in the presence of an excess of said alkali metal dithiocarbamate and heating the reaction mixture to an elevated temperature.

A specific embodiment of this invention resides in a process for the preparation of a thiocarbamyl sulfenamide in which diethylamine is reacted with carbon disulfide and sodium hydroxide at ambient temperature and atmospheric pressure, cyclohexylamine is reacted with sodium hypochlorite at a temperature in the range of from about −5° to about 0° C. and at atmospheric pressure and thereafter the sodium diethyldithiocarbamate is reacted with the N-chlorocyclohexylamine at a temperature of about 0° C., the sodium diethyldithiocarbamate being present in a molar excess in the range of from about 1.1:1 to about 1.25:1 moles of dithiocarbamate per mole of cyclohexylamine, thereafter heating the reaction mixture to a temperature in the range of from about 40° to about 50° C. for a period of time ranging from about 0.02 to about 0.25 hours, followed by rapid cooling and recovering the resultant N,N-diethylthiocarbamyl-N'-cyclohexylsulfenamide.

Other objects and embodiments will be found in the following further detailed description of the present invention.

As hereinbefore set forth the present invention is concerned with an improvement by which improved yields, that is, yields of over 90% may be obtained when condensing an alkali metal dithiocarbamate with a chlorocycloalkylamine.

Examples of alkali metal dithiocarbamates which may be used as one of the starting materials in the process of this invention and which have been prepared by reacting a secondary amine with carbon disulfide and an alkali metal hydroxide at ambient temperature and room pressure will include sodium N,N-dimethyldithiocarbamate, sodium N,N-diethyldithiocarbamate, sodium N,N-dipropyldithiocarbamate, sodium N,N-dibutyldithiocarbamate, sodium N,N-dipentyldithiocarbamate, sodium N,N-dihexyldithiocarbamate, sodium N,N-diheptyldithiocarbamate, sodium N,N-dioctyldithiocarbamate, sodium N,N-dinonyldithiocarbamate, sodium N,N-didecyldithiocarbamate, potassium N,N-dimethyldithiocarbamate, potassium N,N-diethyldithiocarbamate, potassium N,N-dipropyldithiocarbamate, potassium N,N-dibutyldithiocarbamate, potassium N,N-dipentyldithiocarbamate, potassium N,N-dihexyldithiocarbamate, potassium N,N-diheptyldithiocarbamate, potassium N,N-dioctyldithiocarbamate, potassium N,N-dinonyldithiocarbamate, potassium N,N-didecyldithiocarbamate, lithium N,N-dimethyldithiocarbamate, lithium N,N-diethyldithiocarbamate, lithium N,N-dipropyldithiocarbamate, lithium N,N-dibutyldithiocarbamate, lithium N,N-dipentyldithiocarbamate, lithium N,N-dihexyldithiocarbamate, lithium N,N-diheptyldithiocarbamate, lithium N,N-dioctyldithiocarbamate, lithium N,N-dinonyldithiocarbamate, lithium N,N-didecyldithiocarbamate, etc.

It is also contemplated within the scope of this invention that disubstituted dithiocarbamates may also contain mixed alkyl groups such as sodium N-methyl-N-ethyldithiocarbamate, sodium N-methyl-N-butyldithiocarbamate, sodium N-methyl-N-propyldithiocarbamate, sodium N-methyl-N-pentyldithiocarbamate, sodium N-methyl-N-hexyldithiocarbamate, sodium N-ethyl-N-propyldithiocarbamate, sodium N-ethyl-N-butyldithiocarbamate, sodium N-ethyl-N-pentyldithiocarbamate, sodium N-ethyl-N-hexyldithiocarbamate, sodium N-ethyl-N-heptyldithiocarbamate, sodium N-propyl-N-butyldithiocarbamate, sodium N-propyl-N-pentyldithiocarbamate, sodium N-propyl-N-hexyldithiocarbamate, sodium N-propyl-N-heptyldithiocarbamate, sodium N-butyl-N-pentyldithiocarbamate, sodium N-butyl-N-hexyldithiocarbamate, sodium N-butyl-N-heptyldithiocarbamate, potassium N-methyl-N-ethyldithiocarbamate, potassium N-methyl-N-propyldithiocarbamate, potassium N-methyl-N-hexyldithiocarbamate, potassium N-ethyl-N-butyldithiocarbamate, potassium N-ethyl-N-hexyldithiocarbamate, potassium N-propyl-N-butyldithiocarbamate, potassium N-propyl-N-hexyldithiocarbamate, potassium N-butyl-N-pentyldithiocarbamate, potassium N-butyl-N-heptyldithiocarbamate, etc. While the aforementioned substitutions on the thiocarbamyl moiety have been limited to alkyl radicals, it is also contemplated that one or both of the substituents may be cycloalkyl or aryl in nature, some illustrative compounds being sodium N,N-dicyclohexyldithiocarbamate, sodium N,N-dicyclopentyldithiocarbamate, sodium N,N-diphenyldithiocarbamate, sodium N,N-dibenzyldithiocarbamate, potassium N,N-dicyclopentyldithiocarbamate, etc.

The aforementioned alkyl metal dithiocarbamates are reacted in a manner set forth hereinafter with a chloroamine, these chloroamines having been prepared by reacting an amine with an oxidizing agent such as sodium hypochlorite. Examples of these amines and particularly cycloalkylamines which are reacted with the oxidizing agent will include cyclopentylamine, cyclohexylamine, cycloheptylamine, etc. The reaction between the cycloalkylamine and the oxidizing agent such as sodium hypochlorite, potassium hypochlorite, lithium hypochlorite, etc. is effected at reduced or subambient temperatures, usually in a range of from about −5° to about 0° C, and at atmospheric pressure.

The process for effecting the reaction of the present invention whereby improved yields of the desired product may be obtained will, in the preferred embodiment of the reaction, constitute the formation of a slurry of the N-monocyclohexylamine which is maintained at a temperature in the range of from −5° to 10° C. and thereafter adding the alkali metal dithiocarbamate thereto. The alkali metal dithiocarbamate is present in the reaction mixture in an excess over the N-chlorocyclohexylamine, said alkali metal dithiocarbamate being present in a molar ratio in the range of from about 1.1:1 to about 1.25:1 moles of dithiocarbamate per mole of N-chlorocyclohexylamine. Larger amounts of dithiocarbamate may be employed, however, no increase in yield is realized. The slurry containing the two reactants is thoroughly admixed for a period of time in the range of from 0.25 hours to about 4 hours; and upon completion of this time period, it has been found that by heating the final mixture to an elevated temperature in the range of from about 40° to about 50° C. and maintaining the mixture at this temperature for a period of time ranging from about 0.02 hours to about 0.25 hours followed by cooling, it is possible to obtain yields of the N,N-disubstituted thiocarbamyl-N-cycloalkylsulfenamide, in amounts in excess of 90%. As will be hereinafter shown in the examples at the end of the specification, it is critical to the results for the obtention of high yields of desired products that the alkali metal dithiocarbamate be present in a molar excess over the chlorocycloalkylamine and that the mixture be heated to an elevated temperature in the range of from 40° to 50° C. for a relatively short time period within the range hereinbefore set forth. As will be hereinafter shown when operating the reaction at conditions outside these parameters, the result will be that lower yields of the desired product will be obtained thereby.

If so desired, the process of the present invention may be effected in any suitable manner and may comprise either a batch or continuous type operation. When effecting a batch type operation, a quantity of the reactants comprising an alkali metal dithiocarbamate and the N-chlorocycloalkylamine are placed in an appropriate apparatus, the alkali metal dithiocarbamate being present in a molar excess in the range hereinbefore set forth. The temperature of the reaction is maintained in a range of from about −5° to about 0° C. by use of external means such as an ice bath. Upon completion of the addition of the reactants, the mixture is continuously stirred or agitated for a period of time ranging from about 0.25 hours up to about 4 hours or more and thereafter the solution is rapidly heated by external means to a temperature in the range of from about 40° to about 50° C. for a period of time within the range hereinbefore set forth. At the end of this short period of time, the reaction mixture is immediately cooled to a temperature in the range of from 10° to 15° C. upon which the reaction product may become solid in nature. Following this the desired reaction product comprising the N,N-disubstituted thiocarbamyl-N'-cycloalkylsulfenamide will be isolated and recovered by conventional means such as filtration, washing, drying, etc.

It is also contemplated within the scope of this invention that greater yields of the desired product may be obtained in a continuous manner of operation. When such a type of operation is used, the starting materials comprising the alkali metal dithiocarbamate and the N-chlorocycloalkylamine are continuously charged to a reaction vessel which is maintained at the desired operating conditions of temperature and pressure, that is, a temperature in the range of from about −5° to about 0° C. and atmospheric pressure, if so desired. As in the case of the batch type operation, the dithiocarbamate is present in a molar excess over the amine. Upon completion of the passage through the reactor, the effluent is continuously removed and charged to a heated reactor for a relatively short period of time within the range hereinbefore set forth and thereafter withdrawn from this heated reactor to a third reaction zone which is maintained at a temperature in the range of from about 10° to about 15° C. The effluent from this third reaction zone is also continuously removed and the effluent is subjected to separation means similar in nature to those hereinbefore set forth whereby the desired product is isolated and recovered.

It is contemplated within the scope of this invention that the N,N-disubstituted thiocarbamyl-N′-cycloalkylsulfenamides may, if so desired, be converted to an aryl derivative thereof, the latter compound also possessing the desired utility of being an effective accelerator for use in the vulcanization of rubber formulations. This conversion occurs readily and is effected by reacting the N,N-disubstituted thiocarbamyl-N′-cycloalkylsulfenamide with an arylamine acid salt in either equimolar proportions or, if so desired, by employing an excess of either reactants, said excess generally not exceeding 4:1 molar proportions. The conversion is effected at temperatures ranging from ambient up to about 100° C. and for a period ranging from 5 minutes to less than 1 hour.

The following examples are given to illustrate the process of the present invention which, however, are not intended to limit the generally broad scope of the present invention in strict accordance therewith.

EXAMPLE I

In this example N-chlorocyclohexylamine was formed by adding 60 grams (0.1 mole) of a 12.4% sodium hypochlorite solution to a solution of 12.5 grams (0.125 mole) of cyclohexylamine in 75 cc. of water, the sodium hypochlorite solution being added dropwise with stirring while maintaining the temperature of the solution in a range of from −5° to 0° C. by means of an ice bath. After about 5 grams of sodium hypochlorite solution was added a flocculant white precipitate formed. Upon completion of the addition of all of the sodium hypochlorite solution, 100 cc. of a 1 molar (0.10 mole) solution of sodium diethyldithiocarbamate was added while maintaining the solution at a temperature in the range of from −5° to 0° C. The sulfenamide separated as off-white granules. The sulfenamide was isolated by filtration and after drying was recovered in a yield of 72.4% of N,N-diethylthiocarbamyl-N′-cyclohexylsulfenamide, the yield being based on the dithiocarbamate amine.

EXAMPLE II

To illustrate a variation in the procedure, the above experiment was repeated. However, the pH of the sodium hypochlorite-cyclohexylamine slurry was adjusted to 11.5 by the addition of 40% sulfuric acid prior to the addition of the sodium diethyldithiocarbamate. This resulted in the obtention of a 66.9% yield of N,N-diethyldithiocarbamyl-N′-cyclohexylsulfenamide.

EXAMPLE III

The experiment set forth in Example I above was repeated and after completion of the addition of the sodium diethyldithiocarbamate to the slurry of N-chlorocyclohexylamine, the reaction mixture was stirred for a period of 15 minutes and rapidly warmed to a temperature in the range of from about 40° to 45° C. for a period of 0.25 hours. The product was cooled and isolated, there being obtained a yield of 82.7% of N,N-diethylthiocarbamyl-N′-cyclohexylsulfenamide.

When this experiment was repeated with an adjustment of the pH to 11.5 prior to the addition of the sodium diethyldithiocarbamate and heating for 0.25 hours, there was obtained an 82.9% yield of the desired product.

EXAMPLE IV

The experiment set forth in Example I above was repeated again, the difference in the procedure being that after completion of the addition of the sodium diethyldithiocarbamate to the N-chlorocyclohexylamine slurry, the solution was allowed to return to room temperature and continuously stirred for a period of 16 hours. This procedure resulted in the obtention of only a 57.0% yield of the desired product.

EXAMPLE V

In this example the experiment of Example I above was repeated by adding 100 cc. (0.10 mole) of a 1 molar sodium diethyldithiocarbamate solution to a slurry of N-chlorocyclohexylamine at a temperature in the range of from −5° to 0° C. Upon completion of the addition of the carbamate solution, the reaction mixture is stirred for an additional period of 15 minutes and rapidly warmed to a temperature of 40° to 45° C. for varying periods of time. When the heating of the solution was continued for a period of 1 hour followed by cooling, there was obtained a 78.0% yield of the desired product; heating for a period of 0.5 hours followed by cooling resulted in the obtention of 81.3% yield; heating for a period of 0.05 hours resulted in an 85.4% yield while heating for a period of 0.025 hours resulted in an 86.2% yield.

EXAMPLE VI

Again the experiment set forth in Example I above was repeated, the difference in the procedure being that a 10% excess of N-chlorocyclohexylamine over the sodium diethyldithiocarbamate was used and the mixture after completion of the addition was heated to a temperature of 40° to 45° C. for a period of 0.25 hours. The yield in this instance amounted to 84.5%.

When the experiment set forth in Example I using a 10% excess of sodium diethyldithiocarbamate over the N-chlorocyclohexylamine followed by heating at a temperature of 40° to 45° C. for a period of 0.25 hours, the result was an 84.9% yield of N,N-dithiocarbamyl-N′-cyclohexylsulfenamide.

EXAMPLE VII

To illustrate the novel parameters of the reaction conditions necessary to obtain improved yields of the desired product according to the process of this invention, a 10% excess of sodium diethyldithiocarbamate was added to a slurry of N-chlorocyclohexylamine while maintaining the temperature of the reaction in a range of from −5° to 0° C. by means of an ice bath. Upon completion of the addition, the reaction mixture was stirred for an additional 15 minutes and rapidly warmed to a temperature in the range of 40° to 45° C. for a period of 0.025 hours. At the end of this time period, the solution was immediately cooled to a temperature in the range of from 10° to 5° C. The product which melted upon heating to the elevated temperature solidified again upon cooling. The desired product was recovered by filtration and after drying there was obtained a 93.6% yield of N,N-diethylthiocarbamyl-N′-cyclohexylsulfenamide.

A similar yield of over 90% was obtained when this experiment was repeated using a 25% excess of the sodium diethyldithiocarbamate over the N-chlorocyclohexylamine, heating rapidly to a temperature in the range of from 40° to 45° C. for a period of 0.25 hours followed by immediate cooling to a temperature in the range of from 10° to 15° C. The desired product, namely, N,N-diethylthiocarbamyl-N′-cyclohexylsulfenamide was recovered after filtration and drying in a 91.8% yield.

EXAMPLE VIII

In this example N-chlorocycloheptylamine is formed in a manner similar to that set forth in Example I above by adding 60 grams of a 12.4% sodium hypochlorite solution to a solution of 14.0 grams (0.125 mole) of cycloheptylamine which is dissolved in 75 cc. of water. The addition of the sodium hypochlorite solution to the cycloheptylamine is accomplished by adding the hypochlorite dropwise accompanied by continuous stirring while the temperature of the solution is maintained in a range of from −5° to 0° C. by means of an ice bath. Upon completion of the addition of the sodium hypochlorite solution, 125 cc. of a 1 molar potassium diethyldithiocarbamate solution (a molar excess of the dithiocarbamate salt) is added to the N-chlorocycloheptylamine while maintaining the temperature of the solution in a range of from −5° to 0° C. Upon completion of the addition of the dithiocarbamate solution, the solution is stirred for an additional period of 15 minutes and thereafter rapidly heated to a temperature of 45° C. The solution is maintained at this temperature for a period of 0.025 hours and thereafter cooled to 10° C. by immersion in an ice bath. The desired product comprising N,N-diethylthiocarbamyl-N′-cycloheptylsulfenamide is recovered in a yield which is in excess of 90%.

EXAMPLE IX

In like manner a sodium hypochlorite solution is added to a solution of cyclohexylamine dissolved in water, the addition being dropwise accompanied by stirring while maintaining the temperature of the reaction mixture in a range of from −5° to 0° C. Upon completion of the addition of the sodium hypochlorite, an excess of a 1 molar sodium dipropyldithiocarbamate solution is added to the N-chlorocyclohexylamine. Upon completion of the addition of the dithiocarbamate salt, the reaction mixture is rapidly heated to 45° C. and maintained thereat for a period of 0.025 hours. Following this the solution is immediately cooled to a temperature of about 15° C. by immersion in an ice bath. After cooling the desired product comprising N,N-dipropylthiocarbamyl-N′-cyclohexylsulfenamide is recovered by filtration and drying, the yield of the desired product being in excess of 90%.

EXAMPLE X

In a manner similar to that set forth in the above examples N-chlorocyclohexylamine is prepared by the addition of sodium hypochlorite to cyclohexylamine, the reaction being effected under similar temperature conditions. Upon formation of the N-chlorocyclohexylamine the desired product of the present invention is prepared by adding a molar excess of potassium dibutyldithiocarbamate to the N-chlorocyclohexylamine while maintaining the temperature at about 0° C. Upon completion of the addition of the dithiocarbamate solution, the reaction mixture is rapidly heated to a temperature of 45° C. and maintained thereat for a period of 0.025 hours. The solution is then immediately cooled to a temperature of 10° C. by immersion in an ice bath and the desired product comprising N,N-dibutyldithiocarbamyl-N′-cyclohexylsulfenamide is recovered by filtration and drying.

We claim as our invention:

1. In a process for the preparation of a thiocarbamyl sulfenamide which comprises the steps of:
   1. reacting a secondary amine with carbon disulfide and an alkali hydroxide to form an alkali metal dithiocarbamate,
   2. reacting a cycloalkylamine with an alkali metal hypochlorite to form an N-chlorocycloalkylamine, and thereafter
   3. reacting the alkali metal dithiocarbamate and N-chlorocycloalkylamine to form the desired N,N-disubstituted-thiocarbamyl-N′-cycloalkylsulfenamide, the improvement which comprises maintaining said N-chlorocyclohexylamine at a temperature of from about −5° to about 10° C. while adding thereto said alkali metal dithiocarbamate in a molar ratio of about 1.1:1 to about 1.25:1 moles of the latter per mole of the former, thereafter heating the mixture to a temperature of from about 40° to about 50° C. for about 0.02 to about 0.25 hours, and then cooling the reaction mixture to a temperature of from about 10° to about 15° C.

2. The process as set forth in claim 1 in which the reaction of step 1 is effected at ambient temperature and atmospheric pressure.

3. The process as set forth in claim 1 in which the reaction of step 2 is effected at a temperature in the range of from about −5° C. to 0° C. and atmospheric pressure.

4. The process as set forth in claim 1 in which said secondary amine is diethylamine, said alkali hydroxide is sodium hydroxide, said cycloalkylamine is cyclohexylamine, said alkali metal hypochlorite is sodium hypochlorite and said N,N-disubstituted-thiocarbamyl-N′-cycloalkylsulfenamide is N,N-diethylthiocarbamyl-N′-cyclohexylsulfenamide.

5. The process as set forth in claim 1 in which said secondary amine is dibutylamine, said alkali hydroxide is potassium hydroxide, said cycloalkylamine is cyclohexylamine, said alkali metal hypochlorite is sodium hypochlorite and said N,N-disubstituted-thiocarbamyl-N′-cycloalkylsulfenamide is N,N-dibutylthiocarbamyl-N′-cyclohexylsulfenamide.

6. The process as set forth in claim 1 in which said secondary amine is dipropylamine, said alkali hydroxide is sodium hydroxide, said cycloalkylamine is cyclohexylamine, said alkali metal hypochlorite is sodium hypochlorite and said N,N-disubstituted-thiocarbamyl-N'-cycloalkylsulfenamide is N,N-dipropylthiocarbamyl-N'-cyclohexylsulfenamide.

7. The process as set forth in claim 1 in which said secondary amine is diethylamine, said alkali hydroxide is potassium hydroxide, said cycloalkylamine is cycloheptylamine, said alkali metal hypochlorite is sodium hypochlorite and said N,N-disubstituted-thiocarbamyl-N'-cycloalkylsulfenamide is N,N-diethylthiocarbamyl-N'-cycloheptylsulfenamide.

* * * * *